INVENTOR.
Albert C. Leenhouts
BY
Johnson and Kline
ATTORNEYS

United States Patent Office 3,497,780
Patented Feb. 24, 1970

3,497,780
NUMERICAL CONTROL SYSTEM WITH
PLURAL AXES
Albert C. Leenhouts, Granby, Conn., assignor to The Superior Electric Company, Bristol, Conn., a corporation of Connecticut
Filed June 1, 1967, Ser. No. 642,841
Int. Cl. H02p 3/06; G05b 19/18
U.S. Cl. 318—18                                    4 Claims

ABSTRACT OF THE DISCLOSURE

A digitally controlled system which accepts programed instructions to a logic circuitry to cause a first motor driven axis and a second motor driven axis to each have the commanded extent and direction of movement and in which a third and/or a fourth motor driven axis can be programed to be substituted for one or both of the others to have their movement controlled instead by the same logic circuitry.

---

In U.S. patent application Ser. No. 477,133, filed Aug. 4, 1965, entitled *Digital Control System*, and assigned to the assignee of the present invention, there is disclosed a system which accepts programed instructions to effect movement along a pair of axis. The movement on each axis is effected by a stepping motor which in turn is energized according to pulses received by its motor control. The extent of movement and its direction are determined by the number and location of the electrical pulses and the logic circuitry is utilized to regulate the pulses as commanded by the programed instructions. The system is basically an incremental system operating from point to point and one or both of the axes may be operated by each block of information, such as may be provided on perforated tape. After the movement has been completed, the system then advances to follow the instructions in the next block of information.

While such a system has been found eminently satisfactory, in some applications it is desired to not only be able to control two axes, which are generally referred to as the X and Y axes, but also to be able to control a third and a fourth axis, herein referred to as the Z and omega axis. Usually the X and Y axes are mechanically oriented to move a tool or pass work in a plane perpendicular to each other while the Z axis controls the relative height of the plane and the omega axis may control rotation within the plane though naturally the axes may be connected to control other movements. One manner of achieving the control of a plurality of axes is to provide a complete logic system for each axis. However, this has been found to not only render the system more complex, increasing its cost but also to tend to decrease its speed in processing a block of information. Moreover, as generally no more than two axes are operated at the same time by a block of information, having a complete logic circuit for each axis causes them to be inefficiently utilized.

It is accordingly an object of the present invention to provide a numerical control system which accepts programed instructions for controlling movement along a plurality of axes in which there are more axes that may be controlled than there are logic circuits for controlling axes.

Another object of the present invention is to enable the shifting of the logic circuit from one axis to another according to programed instructions and/or manually and also to maintain the non-operated axis immovable when it is not commanded to be moved by a block of information.

In carrying out the system of the present invention, there is provided a control circuit which is essentially similar to the control circuit disclosed in the above-noted application. This system controls two axes, with each axis having a stepping motor which is energized by a motor control. The motor control will accept a pulse on either a forward or a reverse channel and provide a change of energization to the motor to cause it to step one step in the direction controlled by the channel on which the pulse is received. The programed instruction, such as a perforated tape, has a command for each axis which consists of a number that is representative of the number of pulses for the axis and also a direction command. Logic circuitry accepts the command and regulates the system to have this number of pulses supplied to the proper motor control of the axis to be operated.

After the commanded number of pulses has been supplied, the motors will then have been energized to take the number of steps required and as the pulses have ceased, they will cease their movement as the commanded extent of movement has been achieved. Without movement, the motor control maintains each motor energized by a constant energization to thus effectively brake the motor against movement so that it holds the position of the axis to that at which it was last moved.

The present invention includes the same numerical control system and in addition increases the number of axes from two to four. Each axis has a similarly functioning motor and a motor control with pulses as heretofore set forth to the motor control determining the extent and direction of movement of the motor. The logic circuit has two outputs which heretofore were directly connected to the X and Y motor controls but in the present invention they are not connected directly thereto but instead are connected to a selecting means. Each logic circuit output is connectible to two axes and the selecting means is utilized to select which one of two axes will have movement by connecting the logic circuit axis output to the one motor control for the axis which is directed to have movement.

For controlling the selecting of the axis for each logic circuit axis output, the logic circuit has added thereto a pair of two-state means, each state of which controls the connection to an axis output. Such two-state means is controlled in accordance with the instructions on the tape such that in the absence, for example of an instruction, the selecting means will connect one logic circuit axis output to the X axis while with an instruction it will connect it instead to the Z axis motor control. There is similarly provided for the other logic circuit axis output a two-state selecting means for enabling the shifting of the output from the motor control of the Y axis to the motor control of the omega axis with a change in state of the two state means.

Other features and advantages will hereinafter appear.

Figure 1:
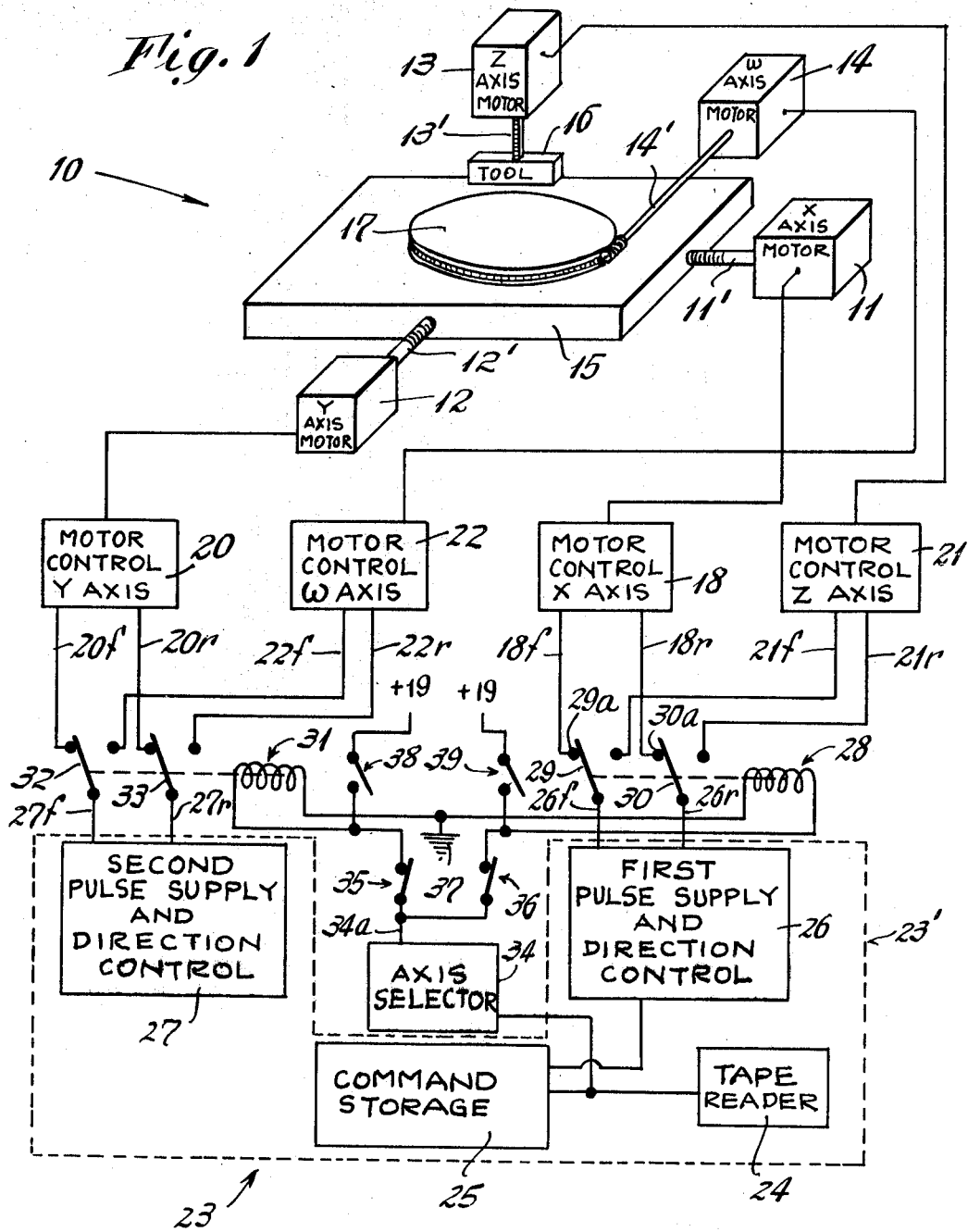
FIGURE 1 is a block diagram and sketch of a numerical control system for a plurality of axes in accordance with the present invention.

Referring to the drawing, the system is generally indicated by the reference numeral 10 and includes an X axis motor 11, a Y axis motor 12, a Z axis motor 13 and an omega axis motor 14. As illustrative of one manner in which the motors may be connected to provide various movements of a machine tool, there is shown a machine tool bed 15 that is moved to and fro by the X axis motor 11 by an interconnection 11' which may be a ball screw. The bed may also be moved back and forth by the Y axis motor 12 through a connection 12' which also may be a ball screw. A tool 16 is connected to the Z axis motor 13 through a connection 13' which may be a gear and rack to move the tool 16 up and down with respect to the bed 15. Mounted on the bed, as diagrammatically shown, is a rotatable table 17 whose rotational movement is controlled by the omega axis motor 14 through a connection 14' which may be a worm and worm gear.

Referring specifically to the X axis motor 11, it is connected to be energized by a motor control 18 which supplies the changes of energization to the motor necessary to cause it to rotate. The motor control 18 is provided with a pair of input channels 18f and 18r each of which will accept a pulse and if the pulse is on the channel 18f, it will be translated into a change of energization of the motor 11 to cause it to move one step in a forward direction. If the pulse is received on the channel 18r, it will cause the motor to move the same extent in the reverse direction. By controlling the number of pulses and the channel on which they appear, the extent and direction of the movement of the motor 11 is controlled and the movement is mechanically directly converted into a proportional movement of the bed 15. For a more complete description of the motor control 18 and the motor 11, reference is made not only to the above-noted application but also to U.S. Patent No. 3,280,395.

Each of the other axis motors has an identical motor control with the Y axis motor 12 having a motor control 20, the Z axis motor 13 having a motor control 21 and the omega axis motor 14 having a motor control 22. Similarly, each of the motor controls 20–22 has forward and reverse input channels indicated by the letters f and r in their reference characters.

The system shown has two logic circuits and is capable of controlling two axes as disclosed in the said application. The different axes may be grouped in any desired manner for alternate control and in the specific embodiment shown, the Y and omega axes are grouped and the X and Z axes are grouped so that each logic circuit output of the system will control one axis of each group. The system 23 is enclosed within the dotted line 23' and is identical to the system disclosed in the above-noted application. Thus there is shown a tape reader 24, a command-storage block 25, a first pulse supply and direction control 26 and a second pulse supply and direction control 27.

The logic system 23 accepts information from the tape reader 24 that is programed on perforated tape and converts it into pulses that may appear on one or the other of output leads 26f and 26r of the first pulse supply which constitutes a logic circuit axis output. Also the system 23 accepts information for the second pulse supply 27 and converts it into pulses which may appear on one or the other of channels 27f or 27r of the second pulse supply, the other logic circuit axis output.

Interconnected between the first group of motor control axes 18 and 21 and the outputs 26f and 26r of the first pulse supply 26 is a selecting means for connecting the output of the supply 26 to either the motor control 18 or the motor control 21. While many forms of selecting interconnections may be employed, an extremely simple means is a two-pole relay 28 having a first pole 29 and a second pole 30. The pole 29 is connected to the output 26f while the pole 30 is connected to the output 26r. The pole 29, normally, i.e. unenergized state of the relay, engages a contact 29a which is connected to the channel 18f of the motor control 18 while the normal position of the pole 30 is a connection to a contact 30a which is connected to the channel 18r. The other position of the poles which occurs when the relay 28 is energized, causes the pole 29 to be connected to the channel 21f and the pole 30 to be connected to the channel 21r.

The other group of axes 12 and 14 similarly is interconnected to a two-pole relay 31 with poles 32 and 33. The normal position of the pole 32 is to connect the output 27f to the channel 20f and the normal position of the pole 33 is to connect the output 27r to the channel 20r. The position of the poles with relay 31 energized is to effect connection between the outputs 27f and 27r and the channels 22f and 22r respectively.

The coils of the relays 28 and 31 are connected in parallel to an output 34a of an axis selector 34. The selector is preferably a two-state means which is capable of having its state shifted from one state wherein the relays are not energized by the output 34a and its other state in which they are energized and thus for example may be simply a flip-flop. The output lead 34a is connected through a SPST switch 35 to the coil of the relay 31 by a parallel connection to the relay 28 through a SPST switch 36. The return leads of the relays are connected to a ground 37.

The state of the axis selector normally controls the energization of the two relays 28 and 31. However, each relay can be removed from the control by operation of its associated switch. For enabling manual control of each of the selecting means which is desirable when the system is under manual operation, there is further provided a SPST switch 38 connected to the coil of relay 31 and another SPST switch 39 connected to the coil of relay 28 each of which is connected to a source of energy 19.

Figure 2:
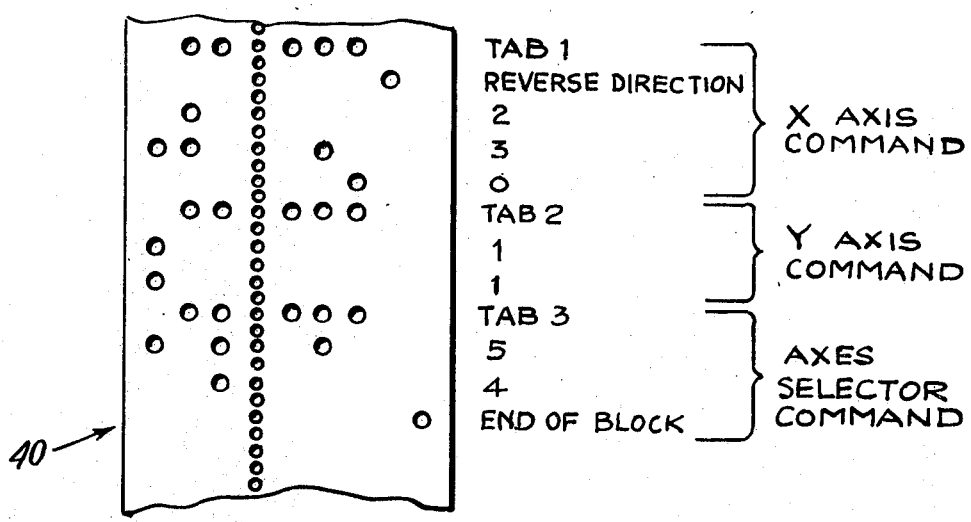
FIGURE 2 is a length of perforated tape having programmed instructions thereof.

Shown in FIG. 2 is a length of perforated tape which may be employed to provide directions to the system. The tape 40 is punched in accordance with a code disclosed in the above-noted application and for convenience, opposite each transverse row of holes on the tape 40 is written the instruction which the holes command to the system. The initial command is a tab 1 which indicates that subsequent information is to be directed to the first pulse supply and direction control 26 with the instructions being to effect movement in the reverse direction 230 pulses. The second pulse supply and direction control 27 is commanded to move in the forward direction 11 pulses by the information following tab 2. The information following tab 3 is the number 54 which is the code used to effect activation of the axis selector 34. The instructions on the tape 40 will cause the Z axis motor control 21 to be connected to the output of the first pulse supply and direction control 26 by reason of energization of the relay 28 and 230 pulses will be supplied on channel 21r. As the relay 31 is also energized, the omega axis is connected to the second pulse supply and direction control 27 and is commanded to move in the forward direction 11 pulses by this number of pulses appearing on the channel 22f. In this example of instructions both the switches 35 and 36 are closed so that the relays 30 and 31 are under the control of the axis selector 34.

The present system requires that each motor only move when it is supplied with a change of energization from its motor control with each motor control being of the type described in U.S. Patent No. 3,117,268. Thus each motor control will provide a change of energization upon receipt of a pulse on either one of its input channels but in the absence of a pulse, the motor control energizes its motor to remain at the position to which it was last moved by supplying a braking current to the motor windings. In accordance with the present invention wherein the pulses supply is connectible to more than one axis, each motor is thus supplied with its own motor control to make each motor, in the absence of receipt of a pulse, be constrained at the position to which it was last moved.

The instructions for energizing the axis selector 34 are shown as the number 54 following the tab 3. This of course may be varied if desired depending upon the decoding circuitry. Moreover, the axis selector 34 upon receipt of instructions to change its state to the energized state will retain said state until the command storage 25 is cleared and all flip-flops including the axis selector 34 is deenergized in accordance with the manner disclosed in the above-noted application which occurs after the instructions in the block of information have been carried out. The normal condition of the axis selector 34 is the state wherein the relays are not energized and it will so remain in the absence of the instructions on the tape.

Figure 3:
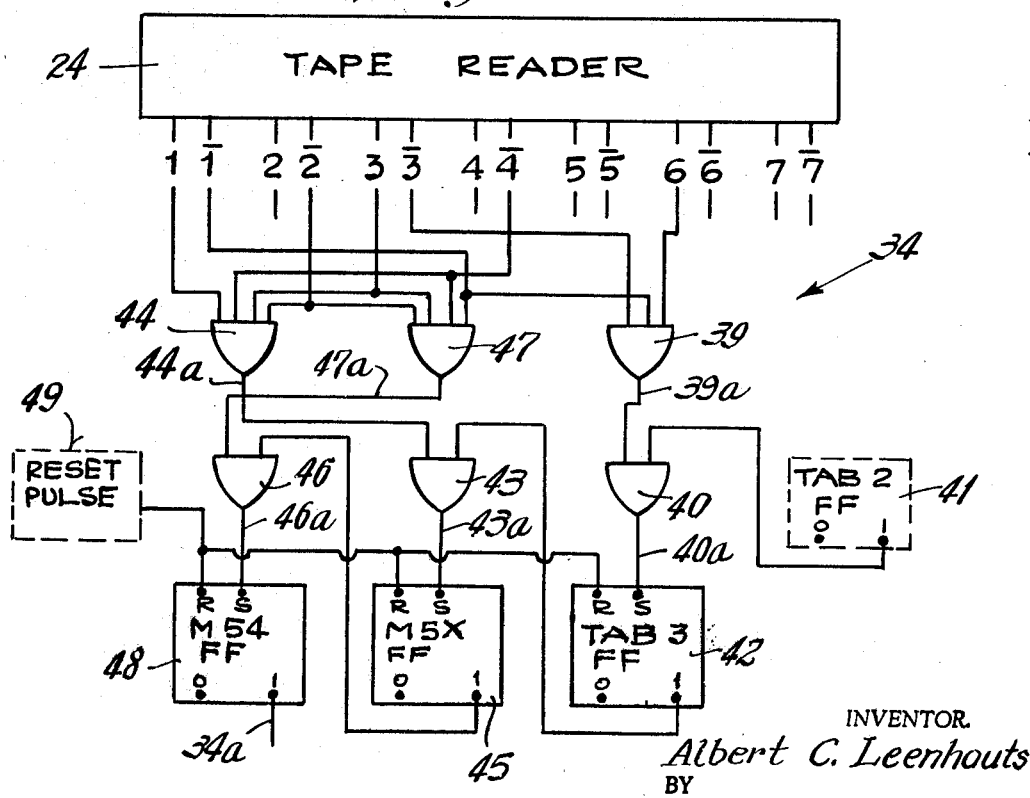
FIG. 3 is a block diagram of the components for shifting the selecting means in accordance with programmed instructions.

Shown in FIG. 3 is a block diagram of the components that control the shifting of the state of the axis selector 34. The perforated tape reader 34 is shown having a plurality of outputs 1 and $\bar{1}$ to 7 and $\bar{7}$. An AND gate 39 has three inputs connected to the reader outputs $\bar{1}$, $\bar{3}$ and 6 and an output 39a connected to the input of an AND gate 40. The other input of the AND gate 40 is connected to the 1 output state terminal of the tab 2 flip-flop 41 which is described in the above-noted application. This flip-flop will be caused to be in the 1 state whenever a tab 2 is read by the reader 24.

The output 40a of the AND gate 40 is connected to the shift terminal of a tab 3 flip-flop 42 whose 1 output state terminal is connected to the input of an AND gate 43. The other input of the AND gate 43 is connected to the output 44a of an AND gate 44 whose four inputs are connected to the reader outputs 1, $\bar{4}$, 3 and $\bar{2}$. The output 43a of the AND gate 43 is connected to the shift terminal (S) of a flip-flop 45 (denoted M5X) which in turn has a 1 output state terminal connected to an input of an AND gate 46. The other input of the AND gate 46 is the output 47a of an AND gate 47 having four input terminals connected to the reader outputs $\bar{2}$, 3, $\bar{4}$ and $\bar{1}$. The output 46a of the AND gate 46 is connected to the shift terminal (S) of a flip-flop 48 having a 1 output state terminal to which the lead 34a is connected.

For resetting the three flip-flops 42, 45 and 48 there is provided a reset pulse circuit 49 shown in dotted lines and connected to the reset terminals (R) of each of the flip-flops. A voltage pulse or level applied to the reset terminal of each of the flip-flops will cause them to attain their 0 state. The reset pulse circuit 49 is disclosed in the above-noted application and hence is shown herein in dotted lines.

With the tab 2 flip-flop being in the 1 state and with the occurrence of a tab 3 being read by the tape reader, all the inputs to the AND gate 39 will be of the same high voltage causing a high voltage level to appear on the lead 39a that is the same as the 1 state voltage level of the tab 2 flip-flop and as both inputs of the AND gate 40 have the same high voltage level, a high voltage level appears on the output 40a. This level is passed to the shift terminal of the tab 3 flip-flop 42 causing it to shift to the 1 state. The flip-flop 45 is changed to the 1 state by the reading of the number 5 after the tab 3 which causes all the inputs to the AND gate 44 to be of the same high voltage level. The output of the AND gate 44 and the 1 state of the flip-flop 42 make all the inputs of the AND gate 43 to be of a high voltage level which causes the output 44a to have a high voltage level which when applied to the shift terminal of the flip-flop 45 causes it to change to the 1 state. The M54 flip-flop 48 has its state changed to the 1 condition with the reading of the number 4 by the tape reader which causes all inputs to the AND gate 44 to be of the same high voltage level and then all inputs to the AND gate 46 to be of the same high voltage level with the change in the voltage level on the output 46a producing the changing of the state of the flip-flop 48. With the flip-flop 48 in the 1 state, the lead 34a becomes energized, energizing the relays 28 and 31 and effecting connection between the first pulse supply 26 and the Z axis motor control 21 and the second pulse supply 27 and the omega axis. Upon the system performing the command instructions, the reset pulse 49 resests each of the flip-flops 42, 45 and 48 to their 0 state in readiness for further instructions. In the absence of instructions on the tape, the flip-flop 48 will maintain its 0 state maintaining connection between the pulse supplies 26 and 27 and the X axis and Y axis motor controls 18 and 20 respectively.

It will accordingly be understood that there has been disclosed a numerically controlled system for operating a plurality of individual motors to control the extent and direction of movement of each motor. The system has a pair of logic circuits each of which translates programed instructions into a series of pulses which are related to the movement required. In accordance with the present invention each of the logic circuits is capable of operating one of two motors and the motor chosen may be selected by the programed instructions. The chosen motor will thus be caused to move the instructed extent and the other motor will be held against movement so that there will not be any loss of position or change in correlation with prior or future instructions. This is achieved by providing each motor with its own motor control that in the absence of the receipt of a pulse from the logic circuit will maintain the motor electrically braked at the position to which it was last moved.

Variations and modifications may be made within the scope of the claims and portions of the improvements may be used without others.

I claim:

1. A numerically controlled system for providing movement along either a first or a second axis comprising a single logic circuit means for accepting commands as programmed instructions and providing a number of pulses indicative of the desired extent of movement on either a first cannel for movement in one direction or on a second channel for movement in the other direction; a first motor connected to provide movement along the first axis, a second motor connected to provide movement along the second axis with each motor providing a specific movement for each change of energization supplied thereto; a first motor control means connected to said first motor and having a first and second channel for receiving pulses and translating each pulse received into a change of energization of said first motor with each pulse on the first channel effecting movement in one direction and each pulse on the second channel effecting movement in the other direction; a second motor control means connected to said semond motor and having a first and second channel for receiving pulses and translating each pulse received into a change of energization of the second motor with each pulse on the first channel effecting movement in one direction and each pulse on the second channel effecting movement in the other direction; each of said motor control means including means for maintaining their respective motor at its last moved to position by maintaining the last change of energization thereto; selector means including first connector means for connecting the first channel of the logic means to either the first channel of the first motor control means or the first channel of the second motor control means and a second connector means for connecting the second channel of the logic means to either the second channel of the first motor control means or the second channel of the second control means; and two-state means in said logic circuit under cortrol of programmed instructions for attaining one state when movement is to be on the first axis and the other state when movement is to be on the second axis, said two-state means being connected to said selecting means to cause said first connector means to connect the first channel of the logic means to the first channel of the first motor control means and the second connector means to connect the second channel of the logic means to the second channel of the first motor control means and for the other state to cause the first connector means to connect the first channel of the logic means to the first channel of the second motor control means and the second channel of the logic means to the second channel of the second motor control means.

2. The invention as defined in claim 1 in which the two-state means is normally in the one state connecting the channels of the logic circuit to the channels of the first motor control means and shifts said state only with the presence of instructions that command shifting.

3. The invention as defined in claim 1 in which there are manually operable means for controlling the first and second connector means to effect connection between the channels of the logic circuit and either the channels of the first motor control means or the channels of the second motor control means.

4. The invention as defined in claim 1 in which the system further provides for movement along a third and a fourth axes, in which the logic circuit includes a third and fourth channel for supplying pulses in accordance with programmed instructions to effect the extent and direction of movement along either axis; in which there is a third motor connected to effect movement along the third axis and a fourth motor connected to effect movement along the fourth axis; a third motor control means connected to the third motor and a fourth motor control means connected to the fourth motor; each of said third and fourth motor control means having a first channel and a second channel with each pulse on a channel effectig movement of their respective motors in one direction or the other and for maintaining their respective motors stationary at their last moved to position in the absence of a pluse; and in which said selector means includes means connected to another two-state means for connecting the third and fourth channels of the logic means to the first and second channels of the third motor control means when the other two-state means is in its one state and to the first and second channels of the fourth motor control means when the other two-state means is in its other state.

References Cited
UNITED STATES PATENTS

| | | |
|---|---|---|
| 2,832,023 | 4/1958 | Gough. |
| 3,015,806 | 1/1962 | Wang et al. |
| 3,063,311 | 11/1962 | Beckwith et al. |
| 3,148,319 | 9/1964 | Frederickson _____ 318—138 X |
| 3,238,430 | 3/1966 | Schuman. |
| 3,239,738 | 3/1966 | Welch _____ 318—138 |

THOMAS E. LYNCH, Primary Examiner

U.S. Cl. X.R.

318—28, 138